UNITED STATES PATENT OFFICE.

JOHN KLEE, OF NEW YORK, N. Y.

PAINT.

SPECIFICATION forming part of Letters Patent No. 325,415, dated September 1, 1885.

Application filed February 4, 1885. (Specimens.)

*To all whom it may concern:*

Be it known that I, JOHN KLEE, of the city, county, and State of New York, have invented certain new and useful Improvements in Wood Primers and Fillers, of which the following is a specification.

This invention has reference to an improved paint composition that serves as a primer and filler for wood used in the manufacture of carriage wheels and bodies; and the invention consists of a paint composition composed of white lead, Venetian red or oxide of iron, rosin, spirits of turpentine, and linseed-oil.

The paint composition is prepared as follows: For each twenty-five pounds of the composition, sixteen pounds of white lead, two pounds of Venetian red or oxide of iron, two pounds of rosin, two and a half pounds of spirits of turpentine, and two and a half pounds of raw linseed-oil are used. The rosin is first dissolved in the spirits of turpentine by slightly heating the same, after which the linseed-oil is added, and finally the white lead and Venetian red, until the parts are intimately mixed. Two coats are given to the wood to be painted, the first one acting as the priming, the second as a filling.

The paint composition forms a water-proof elastic filling that enters into the pores of the wood and covers the same by a thin and durable layer of paint. When the filling has dried, it is carefully sandpapered and the wood coated by the usual number of coats of paints given to wheels and bodies in the manufacture of carriages.

I am aware that a composition consisting of white lead, turpentine, linseed-oil, japan, beeswax, tar, and rosin has been used heretofore, and I hereby disclaim the same.

Having thus described my invention, I claim as new and desire to secure by Letters Patent—

A paint composition for priming and filling wood, consisting of white lead, Venetian red or oxide of iron, rosin, spirits of turpentine, and raw linseed-oil, substantially as set forth.

In testimony that I claim the foregoing as my invention I have signed my name in the presence of two subscribing witnesses.

JOHN KLEE.

Witnesses:
CARL KARP,
SIDNEY MANN.